(Model.)
P. B. PARCELL.
HARROW.
No. 258,107.  Patented May 16, 1882.
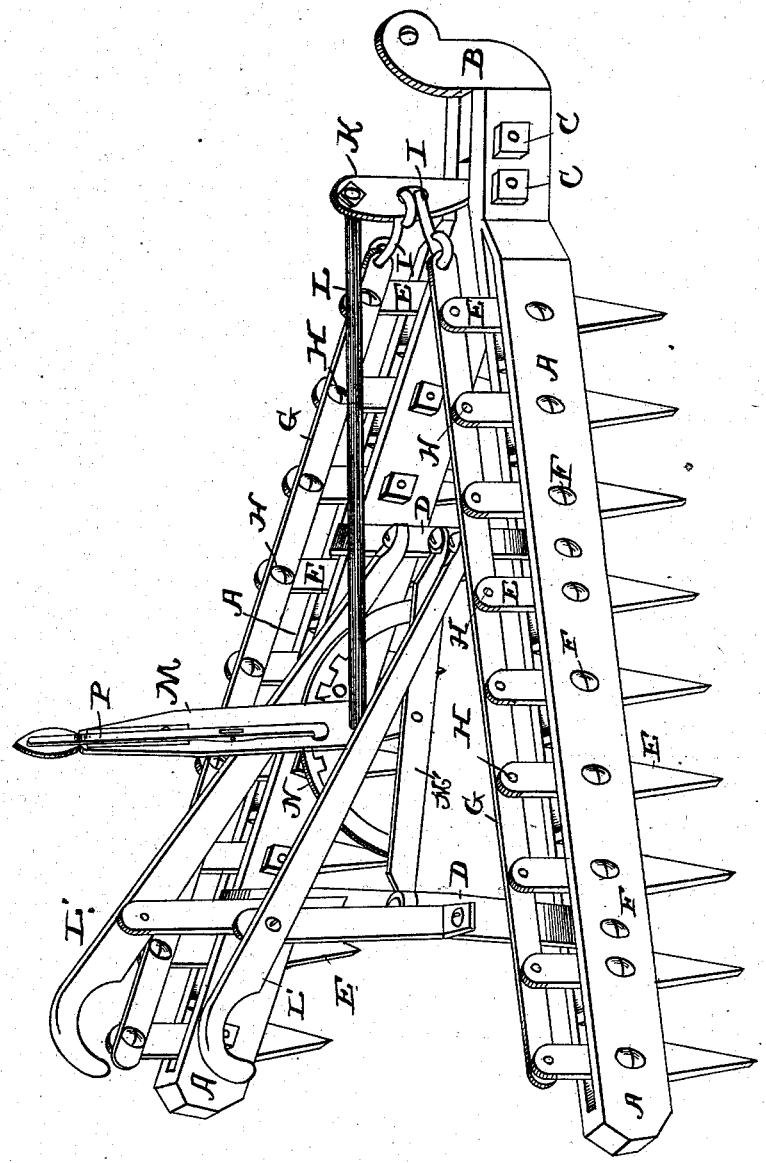
Witnesses,
Edwin L. Yewell.
H. Aubrey Toulmin
Inventor,
Peter B. Parcell,
By C. M. Alexander
his Attorney.

UNITED STATES PATENT OFFICE.

PETER B. PARCELL, OF ASHMORE, ILLINOIS.

HARROW.

SPECIFICATION forming part of Letters Patent No. 258,107, dated May 16, 1882.

Application filed July 22, 1881. (Model.)

*To all whom it may concern:*

Be it known that I, PETER B. PARCELL, of Ashmore, in the county of Coles, and in the State of Illinois, have invented certain new and useful Improvements in Harrows; and I do hereby declare that the following is a full, clear, and exact description thereof, reference being had to the accompanying drawing, and to the letters of reference marked thereon, making a part of this specification.

This invention relates to certain improvements in harrows, and it has for its object to provide for arranging the teeth so that they may readily slip over the ground to permit the harrow to be conveniently drawn from place to place, or set so as to take into the ground when desired, as more fully hereinafter specified, being intended as an improvement over Letters Patent No. 95,467, dated October 5, 1869, granted to myself and P. S. Graves, for harrows, my present object also being to simplify the construction, and thus reduce the cost of the implement. These objects I attain by the apparatus and mechanism illustrated in the accompanying drawing, which shows a perspective view of my invention.

The letter A indicates the frame of the harrow, consisting of two sides converging toward the forward ends, where they are united to a clevis, B, by means of screw-nuts C. Near the rear, and at an intermediate point, the said sides are secured to each other by means of transverse bars D. The said sides, at suitable intervals, are mortised vertically, and in said mortises are pivoted the harrow-teeth E by means of the bolts F. The upper ends of said teeth extend above the sides, and each series of said teeth is secured to a longitudinally-moving bar, G, by means of the pivot-bolts H, so that all of said teeth may be moved simultaneously on their pivots. The said bars G, at their forward ends, are connected by means of links I to a lever, K, fulcrumed at the forward part of the frame, and said lever is connected by means of a rod, L, to a lever, M, which is fulcrumed to a bar, M', secured to the transverse bars D.

The letter N indicates a segment having notches, as indicated by the letter O, the said notches being adapted to receive the end of a lock-lever, P, and hold the lever K and other parts in any desired position.

The letter L' indicates the handles of the harrow, which are secured to the transverse bars connecting the converging sides of the frame.

As constructed, it will be seen that by operating the lever K the teeth may be thrown forward at an angle to take into the ground, or they may be thrown into vertical position, so that the harrow may be drawn over the ground without the teeth taking into the same.

The main object of my improvement on the angular harrow above referred to is to enable the attendant to instantly throw back the points of all the teeth without leaving his position at the handles L' should the teeth strike a stump or a stone, which would be liable to break or derange the machine; also, to allow the attendant to throw back the teeth without stopping the machine when they become clogged with trash.

I am aware that angular harrows and rectangular drags have been made before my invention wherein all of the pivoted teeth with which they are provided are connected indirectly to a single centrally-arranged hand-lever, by vibrating which all of the teeth can be thrown forward or backward; but I am not aware that the combination of devices herein claimed has ever been applied to any harrow.

I am aware that angular and quadrangular harrows having pivoted teeth have had applied to them means for adjusting the teeth forward or backward. This feature, broadly considered, I do not claim. The gist of my invention consists in a novel mode of operating the teeth on both sides of a triangular rigid frame by means of a single hand-lever, which is connected to a short lever that is pivoted between the connected ends of the said rigid frame.

Having thus described my invention, what I claim, and desire to secure by Letters Patent, is—

The combination, with the rigid triangular harrow-frame, its pivoted teeth, and the bars G, to which the upper extremities of these teeth are pivoted, of the lever K, pivoted centrally between the united bars of the said frame, the links I I, loosely connected to said lever and to the front ends of the bars G, the rod L, pivoted to the upper end of the lever K, the hand-lever M, having rod L pivoted to it, the centrally-arranged bar M', the cross-bars D D, the notched segment, and the locking-lever, all arranged in the manner substantially as described.

In testimony whereof I affix my signature, in presence of two witnesses, this 8th day of July, 1881.

PETER B. PARCELL.

Witnesses:
  LONNIE ROBERTSON,
  JOHN L. WOODWORTH.